US005598387A

United States Patent [19]
Pohl

[11] Patent Number: 5,598,387
[45] Date of Patent: *Jan. 28, 1997

[54] HIGH-DENSITY OPTICAL DATA STORAGE UNIT AND METHOD FOR WRITING AND READING INFORMATION

[75] Inventor: Wolfgang D. Pohl, Adliswil, Switzerland

[73] Assignee: International Business Machines Corporation, Armonk, N.Y.

[ * ] Notice: The term of this patent shall not extend beyond the expiration date of Pat. No. 5,461,600.

[21] Appl. No.: 484,245

[22] Filed: Jun. 7, 1995

Related U.S. Application Data

[62] Division of Ser. No. 311,823, Sep. 22, 1994, Pat. No. 5,461,600, which is a continuation of Ser. No. 978,015, Nov. 18, 1992, abandoned.

[30] Foreign Application Priority Data

Jun. 25, 1992 [EP] European Pat. Off. .............. 92810334

[51] Int. Cl.$^6$ ..................................................... G11B 7/135
[52] U.S. Cl. ................................... 369/44.37; 369/44.38; 369/44.12; 369/112
[58] Field of Search .................................. 365/115, 126; 369/43, 44.38, 44.12, 177, 112; 385/14, 31, 33; 359/21, 29

[56] References Cited

U.S. PATENT DOCUMENTS

| | | |
|---|---|---|
| 3,428,952 | 2/1969 | Gold . |
| 3,435,425 | 3/1969 | Hastings . |
| 3,609,002 | 9/1971 | Fraser et al. ............................. 365/121 |
| 3,833,894 | 9/1974 | Aviram et al. ........................... 365/151 |
| 3,877,784 | 4/1975 | Lin ............................................. 385/33 |
| 4,460,988 | 7/1984 | Gordon ..................................... 369/32 |
| 4,945,525 | 7/1990 | Yamamoto et al. .................. 369/44.12 |
| 5,125,750 | 6/1992 | Corle et al. .............................. 359/819 |
| 5,220,555 | 6/1993 | Yanagisawa et al. .................. 369/126 |
| 5,461,600 | 10/1995 | Pohl ....................................... 369/44.12 |

FOREIGN PATENT DOCUMENTS

| | | |
|---|---|---|
| 361932 | 4/1990 | European Pat. Off. . |
| 378444 | 7/1990 | European Pat. Off. . |
| 3607932 | 9/1987 | Germany . |
| 4022711 | 1/1991 | Germany . |
| 57-135445 | 8/1982 | Japan . |
| 62-212937 | 9/1987 | Japan . |

OTHER PUBLICATIONS

Mamin et al. "*Laser Assisted Nanolithography With an AFM*", Bulletin of the American Physics Society, Vol. 37, No. 1 (1992) pp. 565–566.

S. Ura et al., "Linearly focusing grating coupler for integrated-optic parallel pickup", Optical Society of America, Vol. 7, No. 9, Sep. 1990, pp. 1759–1763.

(List continued on next page.)

*Primary Examiner*—Aristotelis Psitos
*Assistant Examiner*—Duncan Wilkinson
*Attorney, Agent, or Firm*—Paik Saber

[57] ABSTRACT

This high-density optical data storage unit comprises a storage medium supported on a mechanically stable substrate, and a read/write arrangement employing a plurality of laser light sources and an interrogation light source. The laser light sources are designed as laser diodes attached to a substrate and optically aligned with an equal plurality of microlenses integrated in a first transparent layer. The read/write arrangement further comprises at least one second transparent layer, and an optional semitransparent conductive coating, said layer or said coating carrying a plurality of particulate protrusions which are also aligned with said diodes and said microlenses, said storage medium and said read/write arrangement being maintained in a mutually parallel alignment with a gap in between having a width of less than 100 nm. The protrusions in combination with the laser light sources produce dints in the medium which are representative of the data to be stored. The data is read by using the interrogation light source to produce light which is scattered by the dints and is then detected by the diodes.

18 Claims, 4 Drawing Sheets

OTHER PUBLICATIONS

J. C. Iwata, "Optical Storage", IBM Research Magazine, vol. 25, No. 1, 1987, pp. 4–7.

R. C. Barrett et al., "Charge storage in a nitride–oxide–silicon medium by scanning capacitance microscopy", J. Appl. Phys., vol. 70, No. 5, Sep. 1991., pp. 2725–2733.

H. J. Mamin et al., "Atomic Emission from a Gold Scanning–Tunneling–Microscope Tip", Physical Review Letters, vol. 65, No. 19, pp. 2418–2421.

U. Fischer et al., "Observation of Single–Particle Plasmons by Near–Field Optical Microscopy", Physical Review Letters, vol. 65, No. 4, pp. 458–461.

HIGH-DENSITY OPTICAL DATA STORAGE UNIT AND METHOD FOR WRITING AND READING INFORMATION

This application is a continuation of application Ser. No. 08/311,823, filed on Sep. 22, 1994, now U.S. Pat. No. 5,461,600, which is a continuation of U.S. application Ser. No. 07/978,015, filed on Nov. 18, 1992, now abandoned, entitled "HIGH-DENSITY OPTICAL DATA STORAGE UNIT AND METHOD FOR WRITING AND READING INFORMATION", in the name of Wolfgang D. Pohl.

BACKGROUND OF THE INVENTION

1. Field of the Invention

This invention relates to a high-density optical storage unit for storing and retrieving electronic information, including encoded data, text, image, and audio information, and a method for writing and reading the information. "High-density" in this context shall mean densities of stored bits of information in excess of $10^9$ bit/cm$^2$.

2. Description of the Prior Art

In conventional optical storage units, the shape and the size of the stored bits are defined by the narrow focal point of a laser beam, making the circular bit regions about 1 micrometer in diameter. This means that the storage density is limited to about $10^{10}$ bits/cm$^2$. The well-known (read-only) compact disk (CD) can store approximately $10^{10}$ bits of information on its entire active surface, for example.

Regarding the storage media used in conventional erasable (read/write) storage units, there are essentially two groups of leading optical contenders each requiring its own technique for reading and writing information: Magneto-optic and phase-change materials. Both techniques employ glass or plastic disks coated with thin films of storage material; they depend on lasers for recording, yet their approach to writing and reading information is markedly different.

As is well known (e.g., from J. C. Iwata, "Optical Storage," IBM Research Magazine, Vol. 25, No. 1, pp. 4–7, 1987), magneto-optic recording relies on heating, by a laser beam, and in the presence of an external magnetic field, a thin film of magnetic material coated onto a substrate. As the temperature of the film is locally raised above the Curie point of the material, the external magnetic field will reverse the original direction of the magnetization at the particular location, and as the spot involved cools, the new direction of the magnetization is "frozen," thus storing a bit of information.

The stored information is read by flashing a laser beam, though at reduced power, onto the storage medium causing those storage locations holding magnetization with a changed direction to slightly rotate the plane of polarization of the reflected beam, a phenomenon known as the Kerr effect. This rotation can be sensed by a photodetector and the stored bit identified.

Erasure of the stored information is done by simply heating the particular storage area to a temperature above the Curie point in the presence of a magnetic field having the original direction.

In phase-change recording, a short (less than 100 ns) burst of laser light converts a tiny spot on the media's highly reflective crystalline surface to the less reflective amorphous, or semicrystalline state, the conversion occurring upon rapidly heating the material to a temperature above its melting point, then rapidly quenching it, "freezing" it into the amorphous state.

For reading the stored information, a laser beam is scanned over the amorphous and crystalline storage locations; the variations of the reflected light are detected and the locations storing a bit of information identified.

Restoring the storage medium to its original state is done by heating the bit locations to a temperature below the material's melting point, but for an "extended" period of time (on the order of $10^{-5}$S).

Both these techniques have the severe disadvantage of being limited in miniaturization by diffraction to a bit size of about $\lambda/2$.

Under the present invention, several recording schemes are conceivable, and two such schemes and the appertaining storage media will be discussed below by way of example. The first scheme to be discussed operates with a thermoplastically deformable storage material in which the bits of information are stored in the form of tiny dints produced by heat and pressure. The second scheme is an electro-optical system using a storage material which has the capability of trapping electrical charges when illuminated by light having a sufficiently short wavelength.

The feature common to these schemes is the accessing in two discrete steps: In a first step, light selects an area of a few square micrometers as determined by the diffraction limit, and in a second step, a small protrusion selects a bit of much smaller size, say as small as a fraction of 0.01 μm square, within said area. In this manner, a very large number of tips, potentially millions, can be operated in parallel.

Work on surface modification by means of a laser-heated tip pressed into a thermoplastically deformable material was reported by H. J. Mamin and D. Rugar in their abstract "Laser-Assisted Nanolithography with an AFM," Bull. Am. Phys. Soc., Vol. 37 (1992) p. 565/6, paper No. M28 5.

Writing information into storage by means of charge injection with a single tip and silicon nitride as the storage medium is known from R. C. Barrett and C. F. Quate, "Charge storage in a nitride-oxide-silicon medium by scanning capacitance microscopy," J. Appl. Phys. 70 (5), Sep. 1, 1991, pp. 2725–2733.

SUMMARY OF THE INVENTION

It is an object of the present invention to overcome the disadvantages of the prior references and/or to further develop the techniques shown therein, and to advance the art of information storage towards higher bit densities, i.e. to higher storage capacities.

The present invention achieves this object by providing a high-density optical data storage unit capable of performing a two-step process of addressing, and comprising a storage medium having a plurality of storage cells which each comprise a plurality of bit areas, said storage medium being supported on a mechanically stable substrate, and a read/write arrangement employing a plurality of read/write light sources/detectors and an interrogation light source. The optical data storage unit of the invention is characterized in that said read/write arrangement comprises a first portion composed of diffraction-limited optical elements for addressing any selected one of said plurality of storage cells, and a second portion composed of near-field optical elements for selecting any one of said plurality of bit areas within the respective addressed storage cell.

The first portion composed of diffraction-limited optical elements comprises a plurality of semiconductor diodes that can be operated both as light sources and light detectors, and which are geometrically aligned with an equal plurality of microlenses embedded in a transparent layer, and the second portion composed of near-field optical elements comprises a plurality of particulate protrusions which are also geometrically aligned with said diodes and with said microlenses, said storage medium and said read/write arrangement being maintained in a mutually parallel alignment with a gap in between having a width of less than 100 nm.

The object is also achieved by the inventive method for writing/reading information into/out of the data storage unit described above, which is characterized by the following two-step addressing scheme: (1) Selection of the bit cells in an array of bit cells by activation of one or more of said laser light sources and their associated optical elements, and (2) selection of individual single-bit areas by means of optical field concentration at the location of said particulate protrusions. This method involves the following steps for writing information: mutually parallel displacing the surfaces of said read/write arrangement and of said storage medium in order to align a selected one of said particulate protrusions with a selected bit location within the associated bit cell, locally changing the characteristics of said storage medium so as to store a bit of information therein.

Under this invention, the following steps are performed for reading information from an arbitrary number of cells in parallel: Mutually parallel displacing the surfaces of said read/write arrangement and of said storage medium in order to align a selected one of said particulate protrusions with the bit location within the associated bit cell from which information is to be read, activating said interrogation light source to cause a light wave to enter into the storage unit, said light wave being particularly scattered at said protrusions and illuminating the diodes associated with those storage locations whose characteristics were previously changed, said diodes then generating an electric output signal representative of the information read.

Details of two embodiments of the invention as well as of the inventive method for data storage and retrieval will hereafter be described by way of example, with reference to the attached drawings.

DESCRIPTION OF THE PREFERRED EMBODIMENTS

As mentioned above, the storage density in conventional optical storage units is naturally limited by the smallest diameter to which a laser beam can be focused, and that is >300 nm. Thus, with a bit diameter of 1 μm, a storage density of about $10^8$ bit/cm$^2$ results. The concept of the present invention in contrast employs some of the techniques developed in connection with the scanning near-field optical microscope which permit a considerably smaller bit size, namely on the order of 10–100 nm and, hence, a storage density of better than $10^{10}$ bit/cm$^2$, as will be explained below.

Figure 1:
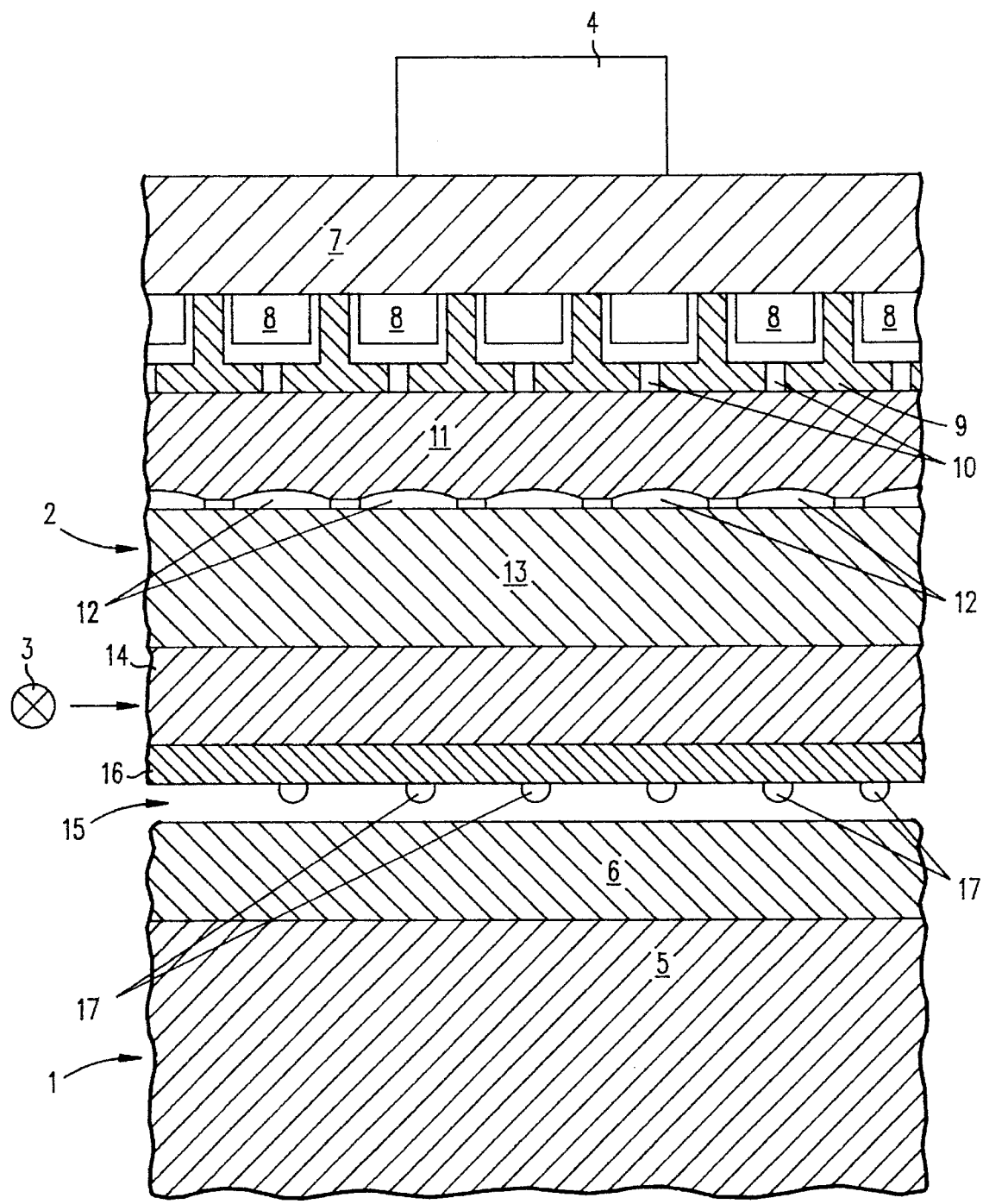
FIG. 1 shows a partial cross section of a first embodiment of the storage unit in accordance with the invention.
Figure 2:
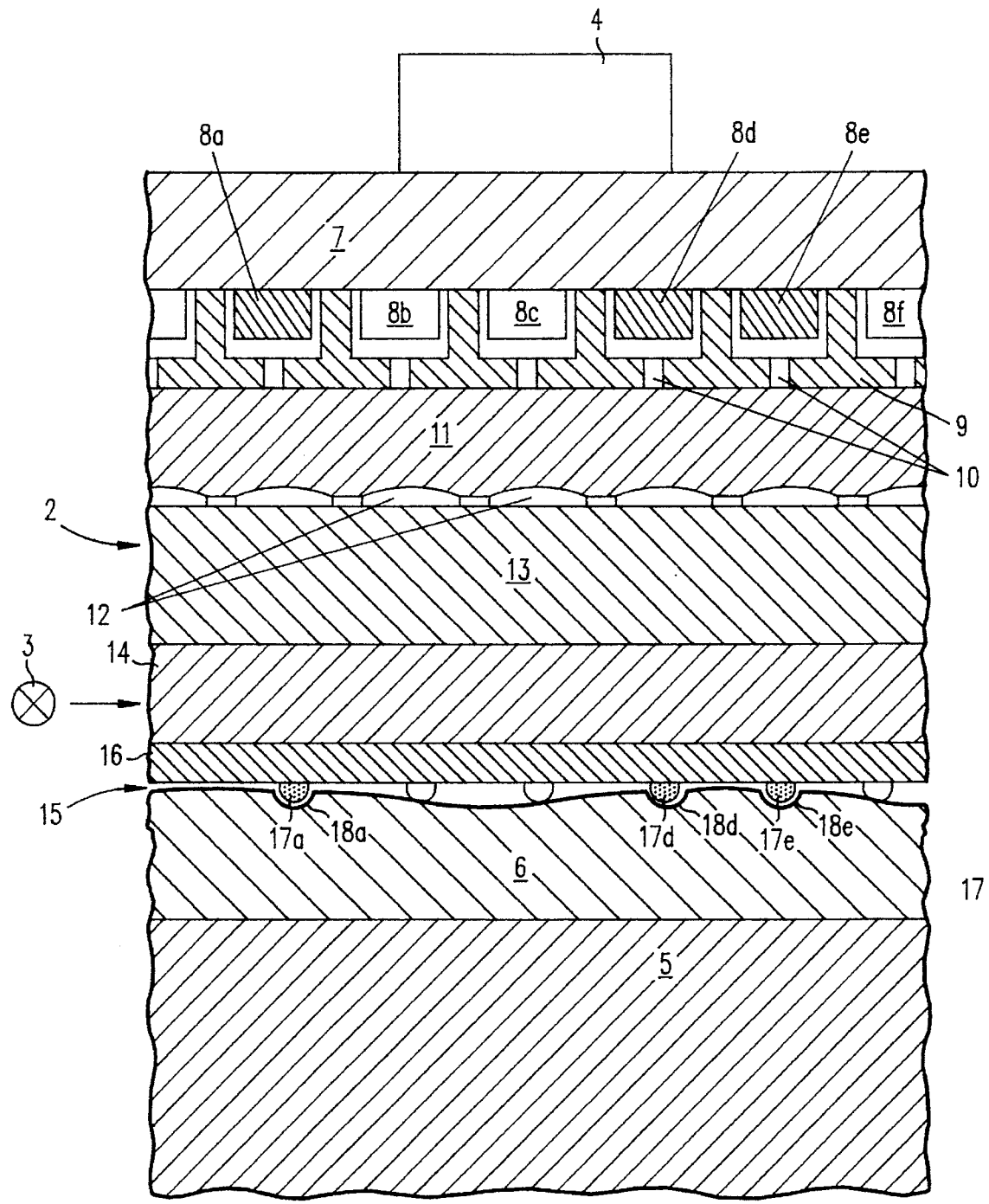
FIG. 2 shows the cross-section of FIG. 1 during the writing process, with three bits being stored.

FIG. 1 shows a partial cross section of a first embodiment of the storage unit in accordance with the invention, the storage unit essentially comprising two flats 1 and 2, respectively acting as record carrier (1) and probe head (2), a light source 3, and control and drive electronics 4 which permit to mutually displace the facing surfaces of flats 1 and 2, and to maintain them in a parallel alignment with a gap width of between 5 and 15 nm even during the displacement. It is known to those skilled in the art that piezoceramic actuators allow for displacements in the 10–100 μm range. Such actuators can be used advantageously in connection with the invention.

In view of the small gap size between flats 1 and 2, their facing surfaces must be machined to a planarity of 3–5 nm over an area of 3–10 mm diameter, corresponding to a finish of "λ/100" with respect to optical wavelengths. Also, the said surfaces are to be kept parallel within the same tolerance of 3–5 nm. It should be noted that these tolerances are standard in high-quality optical interferometry. Preferably, the gap size is controlled by a two-stage mechanism, one stage providing for a rough approach between flats 1 and 2, the other stage permitting fine adjustment of the distance under feedback control. The techniques required to do this may be borrowed from scanning probe microscopies ('SXM') and from interferometric techniques.

In the first embodiment being described, flat 1, the record carrier, essentially comprises a mechanically stable substrate 5 and, on top of it, a storage medium in the form of a thin layer 6 of a suitable material which plastically deforms when placed under pressure and heated locally, with a laser beam, for example. Such a record carrier obviously permits a multitude of information bits to be stored over a principally unlimited period of time.

Flat 2, the probe head, comprises a mechanically stable substrate 7 carrying an array of light-emitting diodes 8 (which may be laser diodes), optionally an opaque screen 9 having holes 10 transparent to the light emitted by the diodes 8 and centered with respect to said diodes 8. Flat 2 further comprises a transparent spacer layer 11 integrating an array of microlenses 12 having a focal length in the 10–100 μm range, a transparent layer 13 of low-refractive index material serving as a spacer and as a substrate for a thin high-refractive index layer 14 acting as the core of an optical waveguide system formed by said layers 13 and 14, the upper pan of the gap 15 between flats 1 and 2, and by a very thin semitransparent coating 16, which may be metallic (gold and silver are favored) or nonmetallic (e.g. tin oxide $SnO_2$). Coating 16 bears an array of small particles 17 of equal size and shape, with a diameter in the range between 10 and 100 nm. Their shape may be (semi-)ellipsoidal with an excentricity between 0 (half-spheres) and about 10 (needles). They may also have the shape of short cylinders, of cones, or of pyramids.

Regarding the fabrication of the array of diodes 8 (assuming a 100×100 array occupying about 3 by 3 mm), standard techniques may be employed. Also, the various layers of different materials, namely layers 9, 11, 13, 14, and 16, as well as lenses 12 and protrusions 17 can be produced by standard deposition techniques.

The particles 17 sitting on coating 16 may be metallic or non-metallic. They may, for example, be produced by conventional lithography in that a suitable mask with holes is placed on top of coating 16, and the metal is deposited (by evaporation or sputtering) through those holes, forming little pyramids or needles similar to those used in scanning force microscopy with micromechanical probes.

One method for depositing material with nanometer dimensions is described in EP-A-0 166 119 where free metal atoms supplied to a sharply pointed tip by sputtering or evaporation are field-desorbed and deposited on a surface under the influence of a strong electric field existing between the tip and said surface.

In accordance with the teaching of EP-A-0 196 346, the particles 17 may also be generated by photo-dissociation of a metalliferous gas under the influence of a laser beam focused in an optical waveguide, which results in the bonding of free metal atoms on the surface of coating 16.

Still another method for producing the particles 17 can be taken from a paper by H. J. Mamin et al., "Atomic Emission from a Gold Scanning-Tunneling-Microscope Tip," Phys. Rev. Lett. 65, No. 19 (1990) pp. 2418–2421, where free metal atoms are deposited by means of field evaporation from the tip of a scanning tunneling microscope.

As mentioned before, the particles 17 should have the same size. If the fabrication process does not provide the desired uniformity, corrections can be made by field evaporation from the too far protruding particles.

As an alternative, the particles 17 may be composed of polystyrene spherules having equal diameters in the range between 25 and 90 nm. These spherules are adsorbed at the surface of coating 16, and both, coating 16 and the spherules are then covered with a gold film which may have a thickness of up to 20 nm. (cf. U. Ch. Fischer and D. W. Pohl, "Observation of Single-Particle Plasmons by Near-Field Optical Microscopy," Phys. Rev. Lett. 62, No. 4 (1989) pp. 458–461).

Again referring to FIG. 1, light source 3 (which is used to interrogate the state of the individual storage locations) consists of a laser operating at a wavelength for which the laser diodes 8 are photo-sensitive and can be used as light detectors. The laser beam from source 3 is fed into the waveguide structure formed by layers 13 to 16, and gap 15 between flats 1 and 2. To avoid scattering at the array of microlenses 12, the low-refractive index layer 13 is chosen sufficiently thick. After passage through the waveguide, the laser beam can either be sent into an absorber or sent back into the laser. Standard couplers, such as prisms or gratings can be used to feed the laser beam into and out from the waveguide.

In operation, flats 1 and 2 are approached to each other so that the gap between the surface of storage medium 6 and the particles 17 is ≦10 nm. The addressing of the individual storage locations is performed in parallel by laterally displacing the flats 1 and 2 by a distance such that the desired storage locations are placed opposite the particles 17. When illuminated, the latter represent perturbations of the light path giving rise to field concentration and light scattering in all directions.

For writing, flat 2 is lowered onto flat 1 so far that the particles 17 exert a small force onto storage medium layer 6. The force is adjusted to a value safely below the elasticity value of the storage medium. This adjustment can, for example, be made with the use of techniques borrowed from scanning force microscopy, as will be obvious to those skilled in the art. Then those laser diodes (8a, 8d, and 8e) which are associated with the areas selected to store a "1" bit at the given address are energized.

The energized laser diodes 8a, 8d and 8e each generate a laser beam providing enough heat—optionally through enhancement by plasmon excitation—to warm up the associated particles 17a, 17d and 17e to cause the storage medium layer 6 to deform plastically beneath them and form an array of dints 18a 18d and 18e. When the laser diodes 8a, 8d and 8e are turned off and flat 2 is retracted, layer 6 will quickly cool down to a temperature well below the melting point thereof, and thus permit the dints to become "frozen" and, hence, the respective information bits to remain stored. The dints may have a depth of 20–50 nm, provided the arrangement is properly adjusted.

The speed of writing information into the storage medium 6 is mainly limited by the speed of the mechanical motion with which flat 2 can be repositioned between two consecutive storage operations, i.e. from one storage location to the next. Assuming 10 µs per repositioning cycle and an array of 33×33 bit positions, the writing speed will be about $10^8$ bit/s.

For reading, interrogation light source 3 is turned on. The light entering the waveguide composed of the layers 13 to 16 and the upper part of gap 15 between flats 1 and 2, is scattered at all imperfections encountered, in particular at the particles 17. It is known from the earlier-mentioned Fischer-Pohl reference in Phys. Rev. Lett. 62 (1989) pp. 458–461, that the intensity of scattering depends on the distance of the medium next to the particles 17. At the sites of the dints 18a, 18d and 18e the distance is larger by about 20 to 50 nm, and this results in a strong variation of the scattering intensity at these locations, the factor of increase or decrease, depending on adjustment, shape and materials parameters, being 2–3, under favorable conditions up to 10.

Such a factor of increase of the scattering intensity is sufficient for the laser diodes 8 to distinguish between the "normal" scattering occurring at all particles 17 and that occurring at the locations of the dints, i.e. at the stored "1" bits. The reading process can be very fast since diodes have rise times on the order of nanoseconds.

The erasure of the stored bits would require the leveling of the dints 18 generated in storage medium 6. In view of the fact that in the generation of the dints heat was used, one might consider heating the entire storage medium to a temperature where the viscosity of the storage material is decreased so as to cause it to flow sufficiently to reestablish a smooth surface.

As mentioned above, the mutual displacement of flats 1 and 2 can be performed by piezoceramic actuators under control of control and drive electronics 4. The actuators can be activated so that each one of the particles 17 sequentially addresses all storage locations within an area determined by the maximum elongation/contraction of the piezoceramic actuators used. This area is defined as one bit cell.

On the assumption that the particles 17 have diameters in the range between 10 and 100 nm, one can conservatively calculate with a bitsize of about 100 nm (diameter). With a scan range of 30 µm defining a storage cell, one obtains a storage capacity of ≈$10^5$ bit/cell. With an array size of 100×100 cells—corresponding to a total storage area of 3×3 mm—the entire storage capacity becomes ≈1 Gbit, corresponding to a storage density of better than $10^{10}$ bit/cm$^2$.

In the case of digital recording of data, the control and drive electronics 4 may, for example, be controlled in such a way that for each "1" bit of information a dint 18 is produced, whereas the "0" bit does not produce any change in the storage medium, but there is no reason why the association cannot be the other way around.

In the case of analog recording of information, such as voice or music, the control and drive electronics 4 can be controlled in such a way, for example, that the depth of the dints created in the storage medium 6 depends on the dynamics of the information to be stored. Thus, a "forte" portion of the information would result in a deeper dint, for example, than a "piano" portion.

The second storage scheme in accordance with the invention which will hereafter be discussed, is an electro-optical system using a storage material which has the capability of trapping electrical charges and changing its refractive index because of the resulting fields. An example of such a material is potassium tantalum niobate (KTN). The storage medium could also be composed of two individual layers of which one is optimized for charge storage (e.g. $Si_3N_4$), the other for electro-optic activity.

Figure 3:
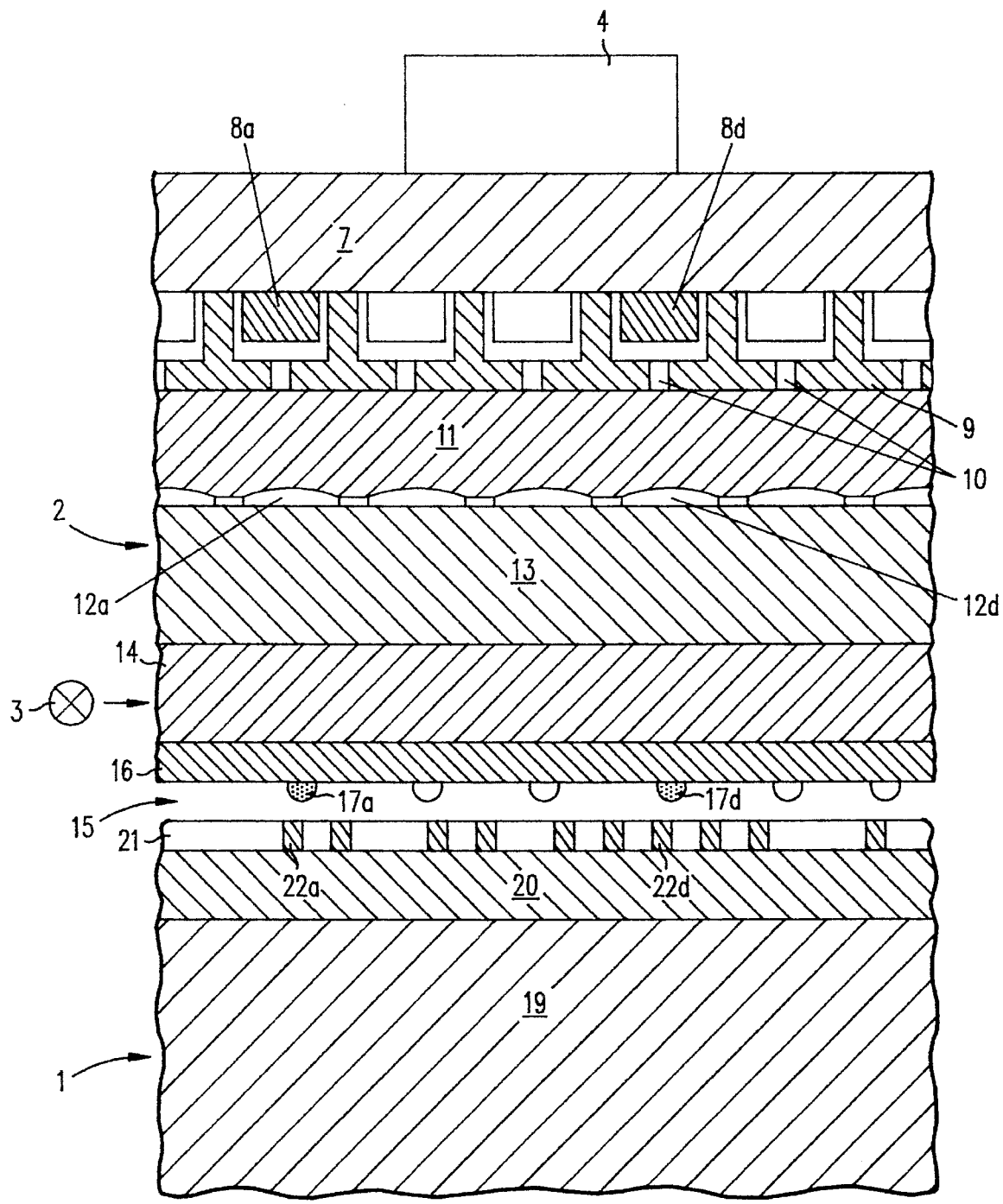
FIG. 3 shows a partial cross section of a second embodiment of the storage unit in accordance with the invention.

As FIG. 3 shows, the structure of this second embodiment is essentially the same as that of the first embodiment (therefore, all identical parts retain their original reference numbers in FIG. 3), with the exception of the storage medium, as follows: Substrarn 19 Of flat 1 consists of a mechanically stable, electrically conductive material. It carries a photoconductive layer 20 with a particularly high dark-resistance. Deposited on photoconductive layer 20 is a layer 21 of an electro-optically active material, such as the before-mentioned potassium tantalum niobate. Layer 21 should be thin enough to allow for effective injection, by field-emission, of charges from the particles 17 of flat 2, or from substrate 19 while photoconductive layer 20 is in its low-resistance state.

The addressing of the individual storage locations is performed the same way as explained in connection with the first-described embodiment of the invention: A particular bit is accessed by enabling the diode 8 which is associated with the storage cell to which the bit location belongs, while the corresponding particle 17 is positioned above the bit being addressed.

For writing, a voltage sufficient for charge injection into electro-optically active layer 21 is applied between coating 16 and, hence, particles 17 and substrate 19. A light pulse from the addressed diode 8 renders the path between the respective particle 17 and substrate 19 through layer 20 sufficiently conductive for charge injection to occur in the area underneath said particle 17. This is accomplished by the static field concentration at particle 17 on the one hand, and by the concentration of the optical near-field with correspondingly increased photoconductivity of layer 20 on the other hand.

In FIG. 3, diodes 8a and 8d may be considered to be activated and exciting surface plasmons at their associated particles 17a and 17d (cf. the above-cited Fischer-Pohl reference). Associated with the plasmons is a particularly strong electric field enhancement with factors >10 for optimal conditions. These strong fields act to locally change the characteristics of the electro-optically active layer 21 at positions 22a and 22d facing said excited particles 17a and 17d.

The reading operation is performed the same as explained in connection with the first-described embodiment of the invention: Laser light source 3 is energized, and the laser light is fed into the waveguide formed by layer 14 and coating 16 of flat 2, the gap 15 between flats 1 and 2, and electro-optically active layer 21 of flat 1. The light wave gets scattered at all particles 17 extending into gap 15. Since the intensity of scattering depends on the properties of the environment of the particles 17, it varies with the alteration of the refractive index where any particular particle 17 is paired with a charge stored in the facing position of electro-optically active layer 21. The variation again may be enhanced by the excitation of surface plasmons at particles 17a and 17d. The scattered light is collected by the associated lenses 12a and 12d of the array of microlenses 12 and focused onto the diodes 8a and 8d, respectively.

To erase the entire information stored, a very strong light wave is entered into the waveguide 13–16, 21. The light wave will destroy the charges stored so that the storage medium 21 is ready again for a further storage cycle. Alternatively, the charges stored may be removed through the application of an electric field of suitable direction between coating 16 and photoconductor layer 20 while the latter is illuminated for resistance reduction thereof.

Erasure of individual stored bits is accomplished by operating the associated diodes as light emitters while the control and drive electronics 4 cause mutual displacement of flats 1 and 2.

Cycle time, bitsize and storage capacity achievable with this second embodiment of the invention essentially correspond to those obtained with the embodiment described first.

Very important is the exact parallel positioning of the working surfaces of flats 1 and 2 with respect to one another. One option is the application of interferometric techniques exploiting the fact that the surfaces of the two flats 1 and 2 are arranged as in a Fabry-Pérot interferometer. Active mirror adjustment devices that operate with the degree of precision required here are commercially available.

Figure 4:
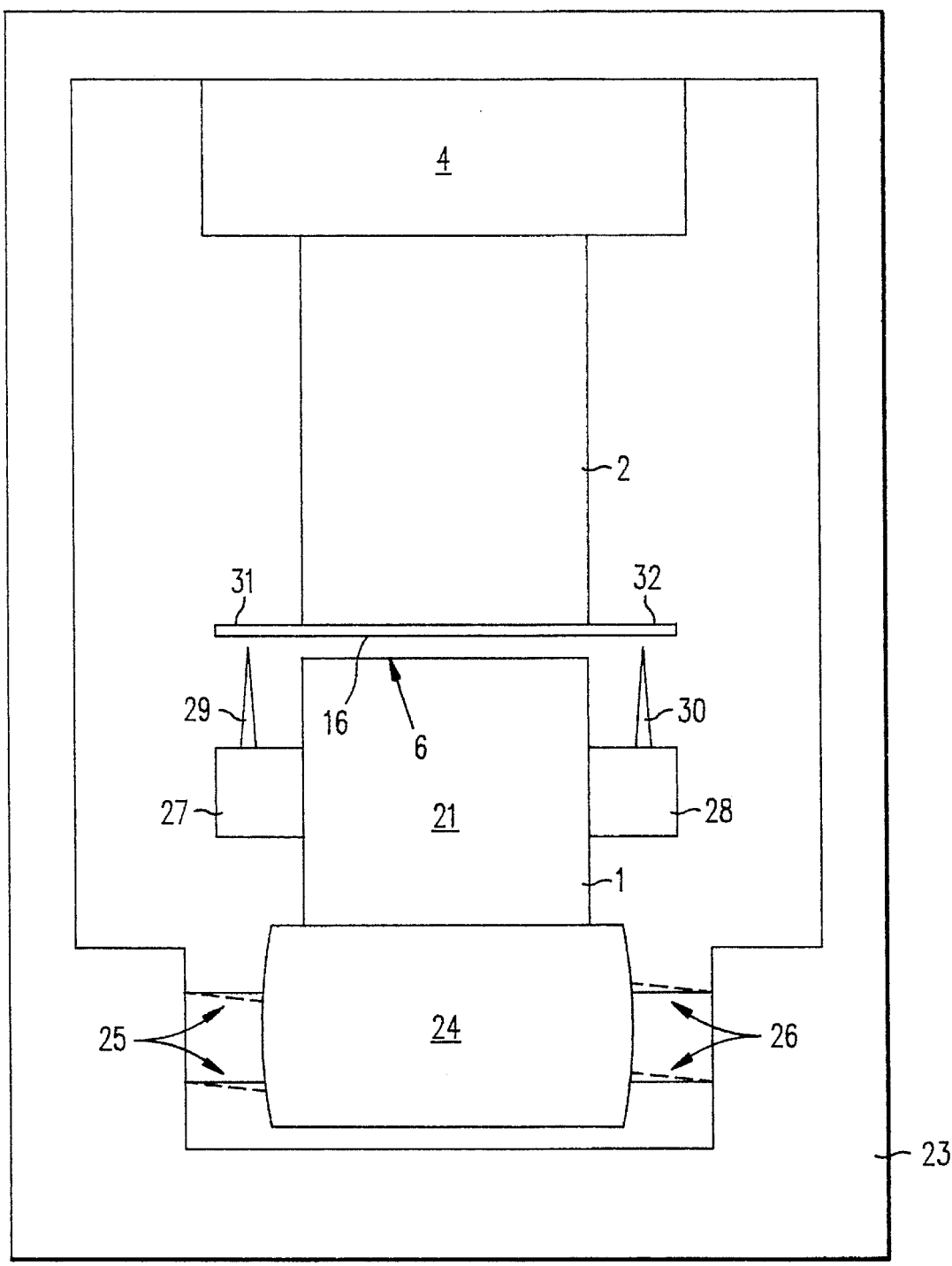
FIG. 4 shows a schematic diagram of a mechanism designed to maintain flats 1 and 2 at all times in a truly parallel relationship.

Another option for parallel positioning will now be described with reference to FIG. 4 which shows a simple means to maintain flats 1 and 2 at all times in a truly parallel relationship, i.e. within a tolerance of 3 to 5 nm, even during lateral displacement. Maintained suspended in a rigid frame 23 is flat 2 by means of control and drive electronics 4. The lower surface of flat 2, represented by coating 16 with its particles 17 faces the upper surface of the storage medium 6; 20, 21 of flat 1, to which it is supposed to be parallel. Flat 1 rests on an adjustment block 24 which is supported within frame 23 by piezoelectric actuators 25 and 26. Rigidly attached to at least two sides of flat 1 are tunneling transducers 27 and 28 comprising tunnel tips 29 and 30 which cooperate with lateral extensions 31, 32 of particle-carrying coating 16.

In operation, assuming proper tunneling regimes and proper parallelism of the surfaces of coating 16 and storage medium 6, 21, equal and constant tunneling currents will flow across the gaps between tunnel tips 29, 30 and extensions 31, 32, respectively. Any deviation from parallelism will cause a drastic alteration of at least one of the tunneling currents. In a feedback loop (not shown) a correction signal will be sent back to either one or both of actuators 25, 26, causing appropriate tilting of adjustment block 24 and, hence, flat 1, to reestablish the parallel alignment of flats 1 and 2.

It will be obvious to those skilled in the art that the same adjustment effect can be achieved without lateral extensions 31, 32, by having tunnel tips 29, 30 cooperate directly with the lower surface of layer 16, provided the latter is conducting. Alternatively, if layer 16 is non-conducting, it will be possible to provide a force microscope arrangement where tips 29, 30 are supported on very thin cantilevers, and the deviation of the cantilevers under the influence of atomic (Van der Waals, etc.) forces is monitored to control the adjustment of parallelism.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical data storage system comprising:

a data storage medium having a plurality of data bit areas;

a plurality of near field optical elements each having a diameter in the range of 10–100 nanometers, each located proximate one of the data bit areas;

an interrogation light source for providing light to the near field optical elements; and a plurality of diffraction limited optical elements, each associated with one of the near field optical elements, each optical element for receiving particularly scattered light from its associated near field optical element.

2. The system of claim 1, wherein the near field optical elements are protrusions from a planar surface, the data storage medium is comprised of a deformable material, and wherein the optical data storage system further comprises a movement means for moving the near field optical elements into contact with the data storage medium, and means for individually providing a light beam to each near field optical element.

3. The system of claim 1, wherein the diffraction limited optical elements comprise a plurality of diodes which are capable of operating both as a light source and a light detector.

4. The system of claim 1, further comprising a plurality of microlenses, each associated with one of the plurality of near field optical elements, the microlenses for providing optical communication between each near field optical element and its associated diffraction limited optical element.

5. The system of claim 1, further comprising an optical waveguide located between the plurality of near field optical elements and the plurality of diffraction limited optical elements, the optical waveguide receiving light from the interrogation light source and distributing it to the plurality of near field optical elements.

6. The system of claim 1, wherein selected data bit areas of the data storage medium have indentations.

7. The system of claim 1, wherein the data storage medium is comprised of a thermoplastic material.

8. The system of claim 1, wherein the distance between the near field optical elements and the data storage medium is less than 100 nanometers.

9. The system of claim 1, further comprising movement means connected to the plurality of near field optical elements for moving the near field optical elements in a direction lateral to a surface of the data storage medium.

10. The system of claim 1, further comprising movement means for moving the near field optical elements in a direction perpendicular to a surface of the data storage medium.

11. The system of claim 10, wherein the movement means comprises a piezoelectric actuator.

12. The system of claim 10, further comprising an adjustment device for controlling the movement means in order to maintain the proper distance between the near field optical elements and the surface of the data storage medium.

13. The system of claim 12, wherein the adjustment device comprises a tunneling transducer.

14. A method for reading data from a data storage system comprising a data storage medium having a plurality of data bit areas, a probe head having a plurality of near field optical elements each optical element having a diameter in the range of 10–100 nanometers, each located proximate one of the data bit areas, an interrogation light source for providing light to the near field optical elements, and a plurality of diffraction limited optical elements, each associated with one of the near field optical elements, each diffraction limited optical element for receiving particularly scattered light from its associated near field optical element, the process comprising the following steps:

positioning the near field optical elements proximate a surface of the data storage medium;

providing a beam of light from the interrogation light source to the near field optical elements such that the light beam is particularly scattered at the near field optical elements; and receiving light from each near field optical element at an associated diffraction limited optical element.

15. The system of claim 14, further comprising the step of laterally displacing the probe head relative to the medium.

16. A method for recording data in a data storage system comprising a data storage medium having a plurality of data bit areas, a probe head having a plurality of near field optical elements having a diameter in the range of 10–100 nanometers, each located proximate one of the data bit areas, a plurality of light emitting diodes, each associated with one of the near field optical elements, the process comprising the following steps:

moving the probe head such that the near field optical elements exert pressure on the storage medium;

energizing selected diodes associated with selected near field optical elements so as to heat said selected near field optical elements to a temperature at which the material of said data storage medium starts flowing and an indentation is formed in the data storage medium;

deenergizing said selected diodes and moving the probe head away from the data storage medium, thereby removing the impact of said near field optical elements from said data storage medium and permitting the data storage medium to cool, thus preserving the indentations.

17. The method of claim 16, further comprising the step of laterally displacing the probe head relative to the medium.

18. A data storage medium having indentations formed using the method of claim 16.

* * * * *